April 14, 1964 J. B. CLARK ET AL 3,129,419

ELECTROMAGNETIC CODE CONVERSION ARRANGEMENTS

Filed Dec. 3, 1958 3 Sheets-Sheet 1

ELECTROMAGNETIC CODE CONVERSION ARRANGEMENTS

Filed Dec. 3, 1958 3 Sheets-Sheet 2

ELECTROMAGNETIC CODE CONVERSION ARRANGEMENTS

Filed Dec. 3, 1958 3 Sheets-Sheet 3

United States Patent Office 3,129,419

Patented Apr. 14, 1964

3,129,419

ELECTROMAGNETIC CODE CONVERSION ARRANGEMENTS

John Brownlie Clark, Bexleyheath, and Percy William Hicks, Wilmington, near Dartford, England, assignors to Associated Electrical Industries (Woolwich) Limited, London, England, a British company Filed Dec. 3, 1958, Ser. No. 777,910

Claims priority, application Great Britain Dec. 9, 1957

5 Claims. (Cl. 340—347)

Figure 1A:
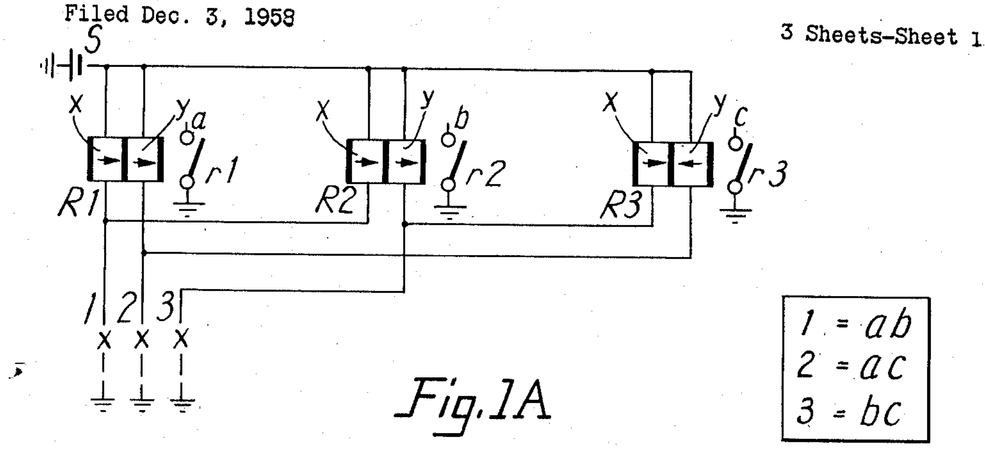

This invention relates to electromagnetic code conversion arrangements by which the numerical value of a digit received in decimal form can be converted into a coded form which involves, for at least certain of the possible digit values, the activation of particular pairs of electromagnetic devices selected from a group of such devices, a different pair of devices being selected for each of these certain values whereas for each other digit value, if any, a single and individual one of the devices is selected for activation on its own. Thus in the case of a decimal digit of which all ten values are possible, there may be either five or four electromagnetic devices which are selected for activation, dependent on the value of the received digit, in accordance with a so-called two-out-of-five code or with a one-or-two-out-of-four code respectively.

Such conversion, which may be required in certain automatic telephone exchange systems and elsewhere, is commonly effected, as regards two-out-of-five coding, by providing each of five electromagnetic devices with four activating (input) windings which are paired with respective activating windings taken one each from the other devices, the windings of each pair being connected in parallel with each other so as to be energised contemporaneously, thereby to activate the pair of devices to which they belong, in response to an electric "marking" signal applied uniquely to a particular one of ten input connections in accordance with the value of a received decimal digit. The actual coding of the decimal digit values in the two-out-of-five code, that is, the code equivalents arbitrarily selected for the different values, determines which particular pair of windings will be connected for energisation in response to a marking signal on any particular input connection. The electromagnetic devices may be relays having four operating windings each, transformers having four primary windings each, or magnetic amplifiers or saturable reactors having four control windings each, these four windings in each case constituting the activating windings already referred to.

By virtue of the inductive coupling tending to exist between these activating windings of the electromagnetic devices, it is inherent that energisation of a pair of windings to activate two of the devices tends to generate E.M.F.'s in the remaining windings of each of these two devices. Since these latter windings are themselves paired with activating windings in the other devices, there is a consequent tendency for each of these other devices to have circulating currents established through two of its input windings by the generated E.M.F.'s. Moreover with all the windings connected in the same sense with respect to their energising circuits, as has hitherto been the practice, such circulating currents in two windings of a device tend to aid each other in the production of flux therein, thus tending to activate the device erroneously. To avoid this it has been usual to include a rectifier in the interconnection between the windings of each pair, in order to block the flow of circulating current.

It is an object of the present invention to provide a simple and more economical arrangement by which circulating currents can be rendered ineffectual without requiring the use of rectifiers.

In the specification which accompanied the basic British application from which the present application claims priority under the provisions of 35 U.S.C. 119, it is stated that according to the invention a code conversion arrangement employing five electromagnetic devices each having four activating (input) windings which are paired for contemporaneous energisation with respective windings taken one each from the other devices, is characterised in that two of the windings of each device are connected with respect to their energising circuits in opposite sense to the other two windings as regards the induction of magnetic flux thereby, and that as regards any three devices, any two of which will, by reason of the pairing, have respective windings which are paired with each other and other respective windings which are paired respectively with two windings on the third device, these two windings on the third device are chosen as having opposite senses of connection if in each of the first two devices the two windings referred to are connected in the same sense as each other, but as having the same sense of connection if these windings in one of said first two devices are connected in the same sense as each other while those in the remaining devices are connected in opposite senses. In this way circulating currents generated on the activation of any two devices and flowing in respective windings in a third will oppose each other in the production of flux in the third device and will therefore be ineffectual to cause erroneous activation thereof.

Analysing the foregoing characteristic of the invention with a view to determining its basic principle, it is noted, firstly, that since the electromagnetic devices are considered in threes as regards the interconnections of their activating windings, the characteristic is evidently generally applicable for any number of devices greater than two, that is, three or more. Secondly, the requirement for pairing, according to which windings of each device are paired respectively with windings taken one from each other device, requires that each device must have, as a minimum, one less winding than there are devices: that is, five devices would require at least four windings each as previously indicated, four devices would require at least three windings each, and so on. Thirdly, it is demonstrable that the requirement for mutual opposition of the circulating currents which are generated on activation of any two devices and flow in respective windings on a third device, requires in general that as regards these three devices, of which each includes two windings paired with respectve windings on the other two, these two windings on each of an odd number of the devices (namely one of them or all three) shall be differentially connected while the two windings on each, if any, other of the three devices shall be connected non-differentially. This last requirement will be demonstrated later in an analysis of possible connections made with reference to drawings.

Based on the foregoing analysis, the invention therefore basically consists in a code conversion circuit comprising $n$ electromagnetic devices, $n$ being in integer greater than two, each having at least $(n-1)$ activating windings paired for contemporaneous energisation in parallel with respective windings taken one each from the other devices, which conversion circuit is characterised in that as regards any three devices taken as a group, and considering in respect of each one of these devices the two activating windings thereof which are paired with activating windings of the other two devices of the group, said two windings are differentially connected with respect to each other in an odd number (one or all) of the three devices and are non-differentially connected in each, if any, of the remaining devices of the group.

Figure 1B:
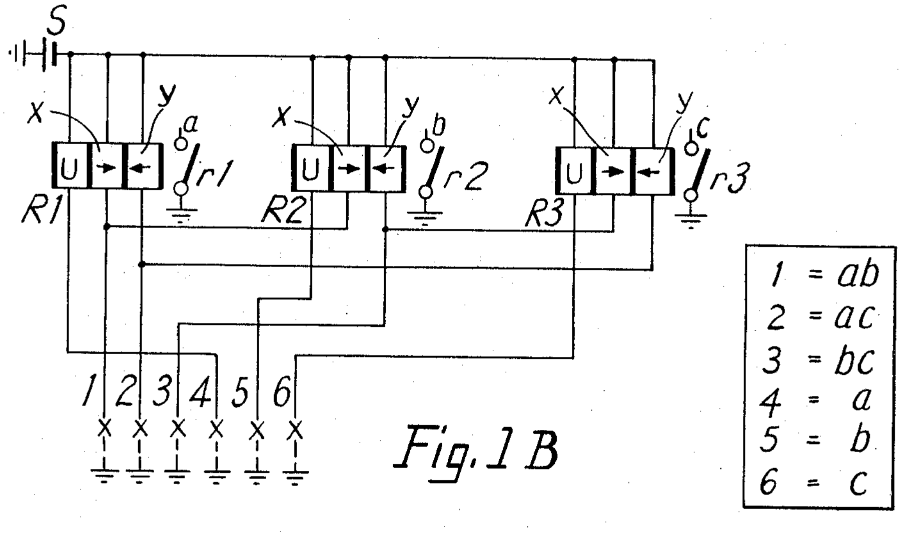
Figure 1C:
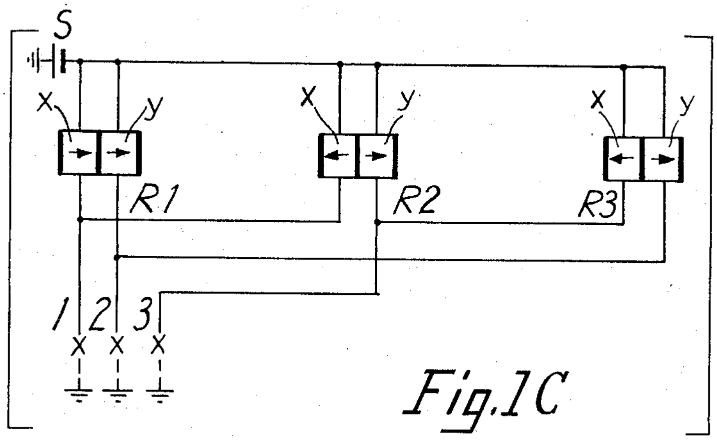
Figure 2A:
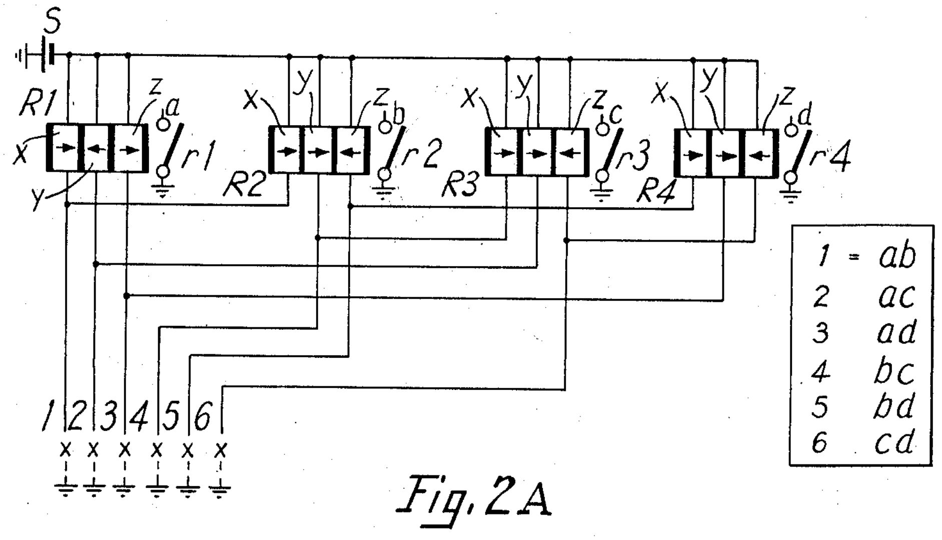
Figure 2B:
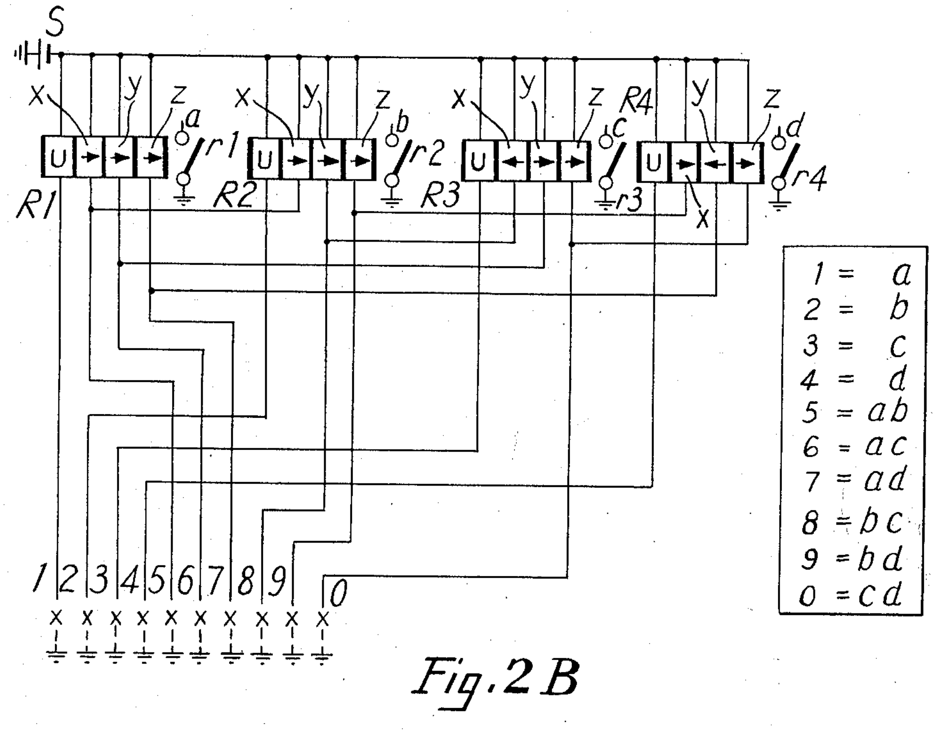
Figure 3A:
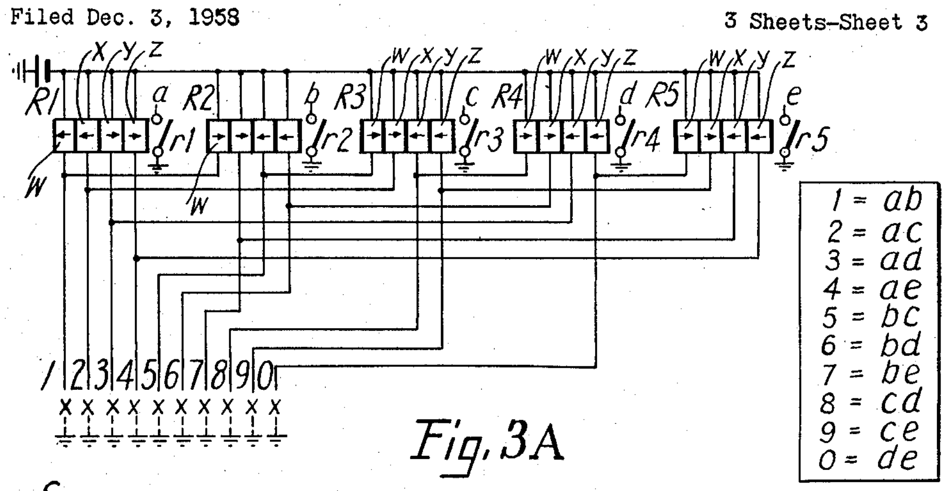
Figure 3B:
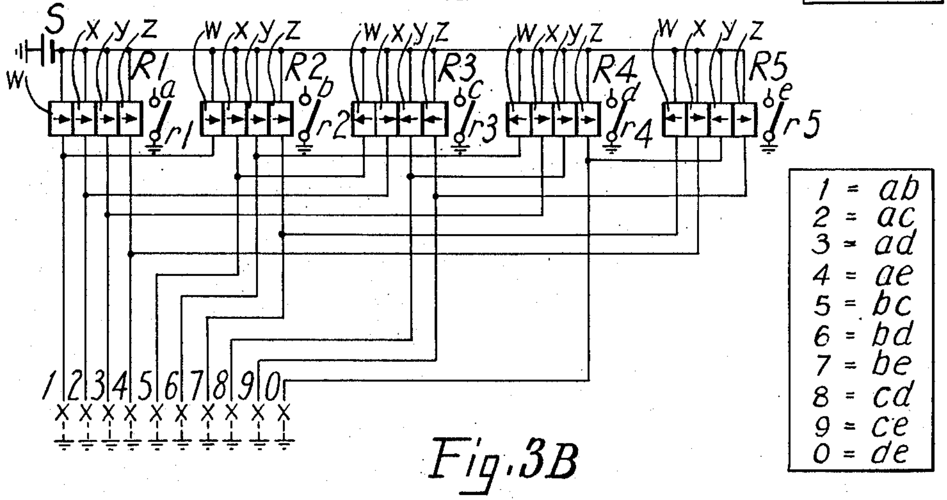
Figure 3C:
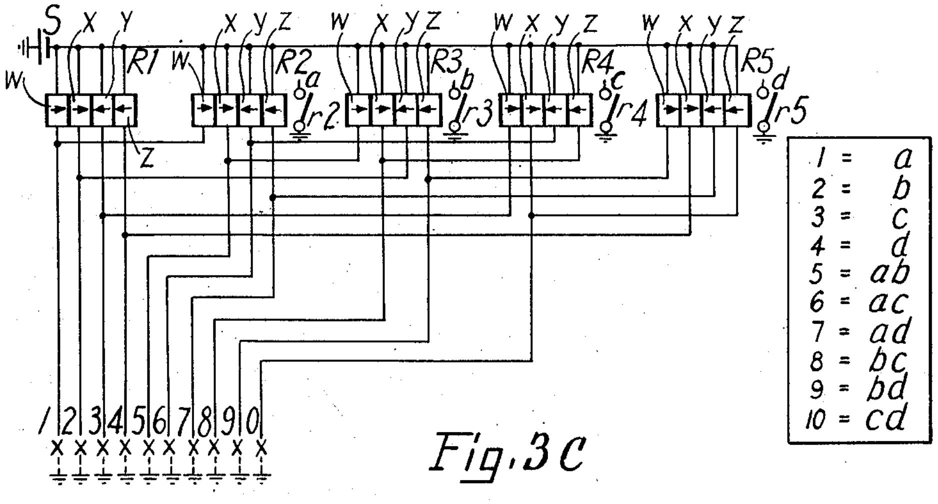

In order that the invention may be more fully understood it will be further explained, and various embodiments will be described, with reference to the accompanying drawings in which:

FIGS. 1A, 1B and 1C together serve to illustrate the basic principles of the invention as now conceived, FIGS. 1A and 1B showing basic three-relay conversion circuits conforming to the invention while FIG. 1C, which does not conform to the invention, serves to demonstrate that whereas the requirements of the invention are satisfied, as regards a group of three relays, by the provision of differential windings on one or all of these relays, they are not satisfied by the provision of differential windings on only two of the relays;

FIGS. 2A and 2B show respective embodiments of the invention employing four relays; and FIGS. 3A, 3B and 3C show respective embodiments of the invention employing five relays.

Referring to FIG. 1A let it be assumed that a digit having three possible values is received as a marking applied to one or another of three input leads 1, 2, 3, according to the particular actual value of the digit, and is to be converted into a coded form represented by markings applied to a particular pair of three output leads *a*, *b*, *c*. The markings are assumed in each case to be earth markings, that is, they are applied by connecting earth to the relevant leads. As regards the input leads 1, 2, 3, no specific mode of applying the markings has been shown (this forming no part of the invention) and the presence of some means for doing so has been indicated simply by applying a cross (*x*) to a dotted line connecting each input lead to earth. As regards the output leads *a*, *b*, *c*, earth markings are applied thereto by closure of respective contacts $r^1$, $r^2$, $r^3$, belonging to relays R1, R2, R3 constituting the conversion circuit.

The relays R1, R2, R3, which have been shown in conventional diagrammatic form have each two windings X and Y, that is, one less than the number of relays. The windings X and Y of each relay are paired for contemporaneous operation with respective windings taken one from each of the other two relays: that is, winding X on relay R1 is paired with a winding (X) on relay R2, winding Y on relay R1 is paired with a winding (Y) on relay R3, and the remaining windings on relays R2 and R3 (Y and X respectively) are also paired together. The windings are paired by being connected in parallel.

A common energising source for the windings has been represented at *s* and the several pairs of windings are connected between one side of this source (the other side being earthed) and respective ones of the input leads 1, 2, 3. By virtue of the pairing, an earth marking applied to input lead 1 causes operation of relays R1 and R2 and thus the marking, through contacts $r^1$ and $r^2$, of output leads *a* and *b*; an earth marking applied to input lead 2 causes operation of relays R1 and R3 and thus the marking of output leads *a* and *c*; and an earth marking applied to input lead 3 causes operation of relays R2 and R3 and thus the marking of output leads *b* and *c*. Consequently the value of a received digit, represented by a marking on the input lead relating to that value, is converted by operation of two of the relays into a marking on a unique pair of the output leads, being thus represented on the output leads in a two-out-of-three code. The digit values and their code equivalents according to the connections shown in FIG. 1A are shown (as in the other figures also) in the box appended to the figure.

The practical use of the circuit of FIG. 1A is limited because it can deal only with three values of received digit and shows no saving in the number of output leads as compared with the number of input leads. There is an advantage however, in representing a digit in two-out-of-three code, because, as is well known, this form of coding readily lends itself to verification.

From the arrowheads appended to the windings X and Y it is seen that, in accordance with the invention, the windings on relay R3 are differentially wound whereas those on relays R1 and R2 are similarly (that is, non-differentially) wound. As a result, energisation of the paired windings of any two relays induces, in the remaining windings of these two relays, circulating currents which respectively flow in the two windings of the third relay but oppose each other as regards the production of operating flux in the latter, thereby ensuring that it will not be erroneously operated. For instance energisation of the X windings of relays R1 and R2, by an earth marking applied to input lead 1, causes induction in the Y windings of these relays of currents which flow in the same senses as each other through the two windings of relay R3 but have no effect on the latter because the windings act differentially. On the other hand energisation of the Y windings of relays R1 and R3 by an earth marking applied to input lead 2 causes induction in the X windings of these relays of currents which flow in opposite senses through the windings of relay R2, but again these induced currents have no effect since the windings of relay R2 are similarly wound. Likewise when an earth marking is applied to input lead 3, currents induced in the non-differential windings of relay R1 from relays R2 and R3 flow in opposite senses and therefore have no effect.

Similar opposing actions of circulating currents would be obtained if the X and Y windings were differentially wound with respect to each other in each of the three relays. Thus referring to FIG. 1B, and ignoring for the moment the windings U on its relays R1, R2, R3, the windings X and Y on these relays are paired for contemporaneous operation as in FIG. 1A but are in each relay differentially wound with respect to each other. Examination of the circuit of FIG. 1B will show that here again the circulating currents which are induced through the X and Y windings of any relay from the windings paired therewith in the other relays, have opposing effects. In FIG. 1B the relays R1, R2 and R3 are shown as each having a third winding U which is not paired with windings on other relays and the winding sense of which is immaterial. These U windings are connected separately to three additional input leads 4, 5, 6, so that an earth marking applied to any one of these leads 4, 5, 6, will cause operation of the relevant relay by itself. Currents induced by energisation of a U winding in any relay will flow in only one winding of any other relay and it can be arranged that this induced current is in itself insufficient to operate such other relay erroneously. This should be compared with the hereinbefore mentioned known arrangement of relays with paired windings, in which the tendency referred to for a relay to operate erroneously is due to induced currents flowing in aiding relationship in two windings of the relay. The circuit of FIG. 1B can cater for digits having six possible values and converts into a one-or-two-out-of-three code as shown in the box appended to the figure.

In FIG. 1C three relays R1, R2, R3 have their windings paired as before but two of these relays have differential windings while the other has non-differential windings. It can be seen that this arrangement does not give opposing actions of circulating currents. For instance energisation of the X windings of relays R1 and R2 by an earth marking applied to input lead 1 causes the induction of circulating currents which flow in opposite directions in the windings X and Y of relay R3. Since the windings of relay R3 are differentially wound these circulating currents therefore aid each other in the production of operating flux for relay R3, with a consequent tendency for this latter relay to be operated erroneously. The scheme of FIG. 1C is therefore inadmissible for the purposes of the invention.

FIG. 2A shows a conversion circuit employing four relays R1, R2, R3, R4 which by closure of their contacts $r^1$–$r^4$ respectively can convert a received digit value into two-out-of-four code markings on output leads *a*, *b*, *c*, *d*, the circuit being therefore able to deal with received digits having any one of six possible values indicated by a marking on the relevant one of six input leads 1–6. Each of the relays has three windings X, Y, Z, and these windings are respectively paired with windings taken one from each of the other relays: for instance windings X, Y and Z of relay R1 are paired respectively with winding X of relay R2, winding Y of relay R3, and winding Y of relay R4. Each pair of windings is connected to one of the input leads 1–6 as before. Consequently an earth marking applied to one of these input leads to represent the value of an incoming digit will result in operation of two of the relays and in the marking of a corresponding pair of the output leads *a, b, c, d*. In the pairing of the windings on relays R1–R4, the senses of the windings are chosen on the basis that, as regards any group of three of these relays, the windings thereof which are mutually paired are either differentially wound on one of the relays of the group and non-differentially wound on the other two, or differentially wound on all three relays of the group. For instance as regards relays R1, R2 and R3, the windings X on R1 and X on R2 are paired, the windings Y on R1 and Y on R3 are paired, and the windings Y on R2 and X on R3 are paired, and of these windings, X and Y on R1 are differentially wound while X and Y on R2 and X and Y on R3 are similarly wound, as indicated by the arrowheads. On the other hand, as regards relays R1, R3 and R4, the paired windings are Y on R1 and Y on R3, Z on R1 and Y on R4, and Z on R3 and Z on R4, and of these windings Y and Z on R1, Y and Z on R3, and Y and Z on R4 are all differentially wound. Induced circulating currents will therefore act in opposition as described for FIG. 1A or FIG. 1B and will prevent these currents from producing erroneous relay operation.

In the converting circuit of FIG. 2B a circuit similar to that of FIG. 2A is extended, by the provision of an additional, unpaired, winding U on each relay R1, R2, R3, R4, to enable all ten possible values of a decimal digit to be converted into a one-or-two-out-of-four code on the output leads *a, b, c, d*. The windings X, Y and Z of relays R1–R4 in FIG. 2B are paired on the same basis as the relay windings in FIG. 2A but the mode of interconnection is such that, whereas in FIG. 2A each relay requires two windings of one sense and one winding of the opposite sense, the X, Y and Z windings in relays R1 and R2 in FIG. 2B are all of the same sense, while in the relays R3 and R4 one of these windings is reversed relatively to the other two. The U windings on the relays have the same action and purpose as those in FIG. 1B.

For converting into two-out-of-five code a decimal digit of which all ten values are possible, a converting circuit employing five relays each with four windings may be used, the windings of each relay being paired with respective windings of the other relays. One such circuit is shown in FIG. 3A, and another in FIG. 3B. In FIG. 3A the relays are all similar to each other in that each includes two windings of one sense and two of opposite sense; in FIG. 3B a non-symmetrical relay arrangement is used, two of the relays (R1 and R2) having all their windings of the same sense, another two (R3 and R4) having one winding reversed relatively to the other three windings, and the remaining relay (R5) having two windings of one sense and two of opposite sense. In both FIG. 3A and FIG. 3B, the paired windings are chosen as regards their respective senses on the same basis as before, namely that as regards any group of three relays the windings thereof which are mutually paired are either differentially wound on one of the relays and similarly wound on the other two, or are differentially wound on all three. Each pair of windings is connected to one of ten input leads 1, 2 . . . 9, 0 so that an earth marking applied to any one of these leads results in operation of a pair of the relays and in the consequent marking of a corresponding pair of the five output leads *a–e*. Induced circulating currents produce mutually opposing actions in the same manner as previously explained.

In the circuit of FIG. 3C, which also employs five relays with four windings each, each relay has two windings of one sense and two of opposite sense as in FIG. 3A but the mode of interconnecting the windings to pair them is somewhat different. For instance as regards relays R1, R2 and R3 taken as a group, the mutual pairing of their windings is such that in FIG. 3A the paired windings (*w*) of relays R1 and R2 are connected in mutually opposite senses, as are also those of relays R1 and R3 and of R2 and R3, whereas in FIG. 3C the paired windings of relays R1 and R3 are connected in mutually opposite senses but the paired windings of relays R1 and R2, and also those of relays R2 and R3, are connected in the same senses as each other.

As regards the pairing of the relay windings in FIG. 3C, the circuit of this latter figure could be used, if desired, for the conversion of a decimal digit into two-out-of-five code, for which purpose the relays R1–R5 would have respective contacts $r^1$–$r^5$ connected to output marking leads *a–e* as in FIGS. 3A and 3B. FIG. 3C, however, shows an arrangement of relay contacts which gives conversion of a decimal digit into one-or-two-out-of-four code—an arrangement which could equally be used for the relays in FIGS. 3A and 3B if desired. In FIG. 3C only four output leads *a, b, c, d* are shown and these can be marked by closure of relays $r^2$, $r^3$, $r^4$, $r^5$ belonging respectively to relays R2–R5. The resultant coding is shown in the box appended to the figure. With this arrangement the relay $R^1$ plays no part in the marking of the output leads and serves only to provide a transformer action which, on application of earth markings to the input leads 1–4, produces circulating currents to oppose the action of the circulating currents which are then generated in the other relays. There is thus obtained a more certain prevention of erroneous relay operation than is obtainable where, as in FIGS. 1B and 2B, reliance is placed on the inability of a relay to be operated by circulating current flowing in only one of its windings.

It will be appreciated from the foregoing that there is a substantial number of ways in which the relay windings can be arranged as regards their interconnection and relative senses. Moreover, although conversion circuits employing relays have been specifically described, it is to be understood that, as already indicated, other electromagnetic devices having corresponding numbers of activating windings, similarly paired, may be employed instead. For instance transformers having the requisite numbers of activating (primary) windings could be used, each having a secondary winding connected to energise an output connection in response to energisation of one of its primary windings, saturable reactors having the requisite numbers of activating (saturating) windings could be employed, each being connected to energise an output connection from a main (alternating current) winding thereof on saturation by energisation of one of its input windings.

What we claim is:

1. A code conversion circuit comprising $n$ electromagnetic devices, $n$ being greater than two, at least $n-1$ activating windings on each of said devices, and connections by which each of said $n-1$ windings of each device is paired for contemporaneous energization with one of the activating windings of one of the other devices, said connections being organized in such manner that the windings with which the $n-1$ windings of each device are respectively paired belong to separate ones of the other devices and that as regards any three of said devices taken as a group, and considering in respect of each device in such group the two activating windings thereof which are paired with activating windings of the other two devices of the group, said two windings are differentially connected with respect to each other in an odd number of the three devices of the group and are non-differentially connected in each of the remaining devices of the group.

2. A code conversion circuit as claimed in claim 1 wherein for the conversion of decimal digit values into two-out-of-five code, there are five said devices each of which has four activating windings which are paired for contemporaneous operation with respective activating windings of the other devices, said circuit having five output leads respectively associated with said five devices and each individually electrically marked by activation of its associated device.

3. A code conversion circuit as claimed in claim 1 wherein for the conversion of decimal digit values into one-or-two-out-of-four code, there are five said devices each of which has four activating windings which are paired for contemporaneous operation with respective activating windings of the other devices, said circuit having four output leads respectively associated with four of said five devices and each individually electrically marked by activation of its associated device.

4. A code conversion circuit as claimed in claim 1 wherein the electromagnetic devices have additional, unpaired, activating windings which are individually energisable.

5. A code conversion circuit as claimed in claim 1 wherein for the conversion of decimal digits into one-or-two-out-of-four code, there are four said devices each of which has three activating windings paired for contemporaneous energisation with respective activating windings from the other devices and an additional, unpaired activating windings which is individually energisable, said circuit having four output leads respectively associated with said four devices and each individually electrically marked by activation of its associated device.

References Cited in the file of this patent

UNITED STATES PATENTS

| | | |
|---|---|---|
| 876,701 | Drewell | Jan. 14, 1908 |
| 2,139,079 | Haselton | Dec. 6, 1938 |
| 2,364,540 | Luhn | Dec. 5, 1944 |
| 2,576,099 | Bray | Nov. 27, 1951 |
| 2,620,974 | Ualtat | Dec. 9, 1952 |
| 2,647,689 | Bowyer | Aug. 4, 1953 |
| 2,735,091 | Burkhart | Feb. 14, 1956 |
| 2,792,987 | Stibitz | May. 21, 1957 |
| 2,817,079 | Young | Dec. 17, 1957 |
| 2,856,256 | Carman | Oct. 14, 1958 |